United States Patent
Godo et al.

(10) Patent No.: US 11,976,722 B2
(45) Date of Patent: May 7, 2024

(54) AXLE ASSEMBLY AND METHOD OF CONTROL

(71) Applicant: ArvinMeritor Technology, LLC, Troy, MI (US)

(72) Inventors: Edvin Godo, Troy, MI (US); Banuchandar Muthukumar, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 28 days.

(21) Appl. No.: 17/877,215

(22) Filed: Jul. 29, 2022

(65) Prior Publication Data

US 2024/0035563 A1 Feb. 1, 2024

(51) Int. Cl.
| | |
|---|---|
| *F16H 61/12* | (2010.01) |
| *F16H 61/04* | (2006.01) |
| *F16H 61/28* | (2006.01) |
| *F16H 63/50* | (2006.01) |

(52) U.S. Cl.
CPC ......... *F16H 61/0403* (2013.01); *F16H 61/12* (2013.01); *F16H 61/2807* (2013.01); *F16H 63/502* (2013.01); *F16H 2061/0422* (2013.01); *F16H 2061/1232* (2013.01)

(58) Field of Classification Search
CPC ......... F16H 61/0403; F16H 2061/0422; F16H 63/502
See application file for complete search history.

(56) References Cited

U.S. PATENT DOCUMENTS

| | | | |
|---|---|---|---|
| 8,083,642 B2 | 12/2011 | Senoo | |
| 8,428,837 B2 | 4/2013 | Tomoda | |
| 10,989,288 B1 | 4/2021 | Ghatti et al. | |
| 11,002,352 B2 | 5/2021 | Ghatti et al. | |
| 11,038,396 B2 | 6/2021 | Raya et al. | |
| 11,207,976 B2 | 12/2021 | Ghatti et al. | |
| 11,209,072 B2 | 12/2021 | Ghatti et al. | |
| 11,220,176 B1 | 1/2022 | Cradit et al. | |
| 2014/0070741 A1* | 3/2014 | Luedtke | B60W 10/08 318/400.15 |
| 2019/0101199 A1* | 4/2019 | Bedert | F16H 3/126 |
| 2020/0378462 A1* | 12/2020 | Rennex | A43B 13/181 |
| 2021/0023944 A1* | 1/2021 | Ravichandran | B60K 23/0808 |
| 2021/0101478 A1* | 4/2021 | Ghatti | F16H 3/097 |
| 2021/0291646 A1 | 9/2021 | Lorenz et al. | |

FOREIGN PATENT DOCUMENTS

| | | | | |
|---|---|---|---|---|
| DE | 102012007622 A1 | 10/2013 | | |
| EP | 0608978 A1 * | 8/1994 | | F16H 61/12 |

OTHER PUBLICATIONS

Cradit et al, U.S. Appl. No. 17/308,307, filed May 5, 2021, 46 pages.
Extended European Search Report dated Jan. 9, 2024 for related European Appln. No. 23186763.1 7 Pages.

* cited by examiner

*Primary Examiner* — Stacey A Fluhart
(74) *Attorney, Agent, or Firm* — Brooks Kushman PC

(57) ABSTRACT

A method of controlling an axle assembly. The method includes executing a speed synchronization mode and operating a clutch actuator to shift a clutch from a neutral position toward an engaged position. The method may also include executing a low torque synchronization mode when the clutch cannot be shifted from a neutral position to an engaged position within a first predetermined period of time.

20 Claims, 3 Drawing Sheets

AXLE ASSEMBLY AND METHOD OF CONTROL

TECHNICAL FIELD

This relates to an axle assembly for a vehicle and a method of control.

BACKGROUND

A drive axle system having electric motors is disclosed in United States Patent Publication No. 2021/0291646.

SUMMARY

In at least one embodiment a method of controlling an axle assembly is provided. The axle assembly has a transmission, an electric motor, a clutch, and a clutch actuator. The transmission has a set of gears. The electric motor provides torque to the transmission. The motor has a rotor that is rotatable about an axis. The rotor is operatively connected to the transmission. The clutch is selectively engageable with a member of the set of gears. The clutch actuator is configured to actuate the clutch. The method includes executing a speed synchronization mode that modifies a rotational speed of the rotor without clipping the torque that is provided by the electric motor so that the rotational speed of the rotor becomes closer to the rotational speed of the clutch. The method also includes operating the clutch actuator to shift the clutch from a neutral position toward an engaged position. The method also includes determining whether the clutch is shifted from the neutral position to the engaged position within a first predetermined period of time.

The clutch is disengaged from the set of gears when in the neutral position. The clutch is shifted to the engaged position when teeth of the clutch mesh with teeth of the member of the set of gears. The clutch may couple the member of the set of gears to a shaft when the clutch is in the engaged position.

Determining whether the clutch is shifted from the neutral position to the engaged position may be based on a signal from the clutch actuator. Determining whether the clutch is shifted from the neutral position to the engaged position may be based on a signal from a clutch position sensor. The signal from the clutch position sensor may be indicative of a position of the clutch.

The method may include stopping operation of the clutch actuator that shifts the clutch from the neutral position toward the engaged position when shifting of the clutch is completed within the first predetermined period of time.

The method may include executing a low torque synchronization mode when the clutch is not shifted from the neutral position to the engaged position within the first predetermined period of time.

The clutch actuator may continue to actuate the clutch from the neutral position toward the engaged position when the low torque synchronization mode is executed and the first predetermined period of time has elapsed.

Executing the low torque synchronization mode may include adjusting the rotational speed of the rotor to track a rotational speed of the clutch while limiting output torque of the electric motor. Limiting output torque of the electric motor may prevent unintended acceleration or deceleration when the clutch meshes with the member of the set of gears.

The method may include determining whether the clutch is shifted from the neutral position to the engaged position within a second predetermined period of time when the low torque synchronization mode is executed. The first predetermined period of time may differ from the second predetermined period of time.)

The method may include stopping operation of the clutch actuator that shifts the clutch from neutral position toward the engaged position when shifting of the clutch is completed within the second predetermined period of time.

The method may include operating the clutch actuator to actuate the clutch to the neutral position when shifting of the clutch is not completed within the second predetermined period of time. The method may include providing an error signal when shifting of the clutch is not completed within the second predetermined period of time.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It will also be understood that, although the terms first, second, etc. are, in some instances, used herein to describe various elements, these elements should not be limited by these terms. These terms are only used to distinguish one element from another. For example, a first element could be termed a second element, and similarly a second element could be termed a first element without departing from the scope of the various described embodiments. The first element and the second element are both elements, but they are not the same element.

The terminology used in the description of the various described embodiments is for the purpose of describing particular embodiments only and is not intended to be limiting. As used in the description of the various described embodiments and the appended claims, the singular forms "a" and "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
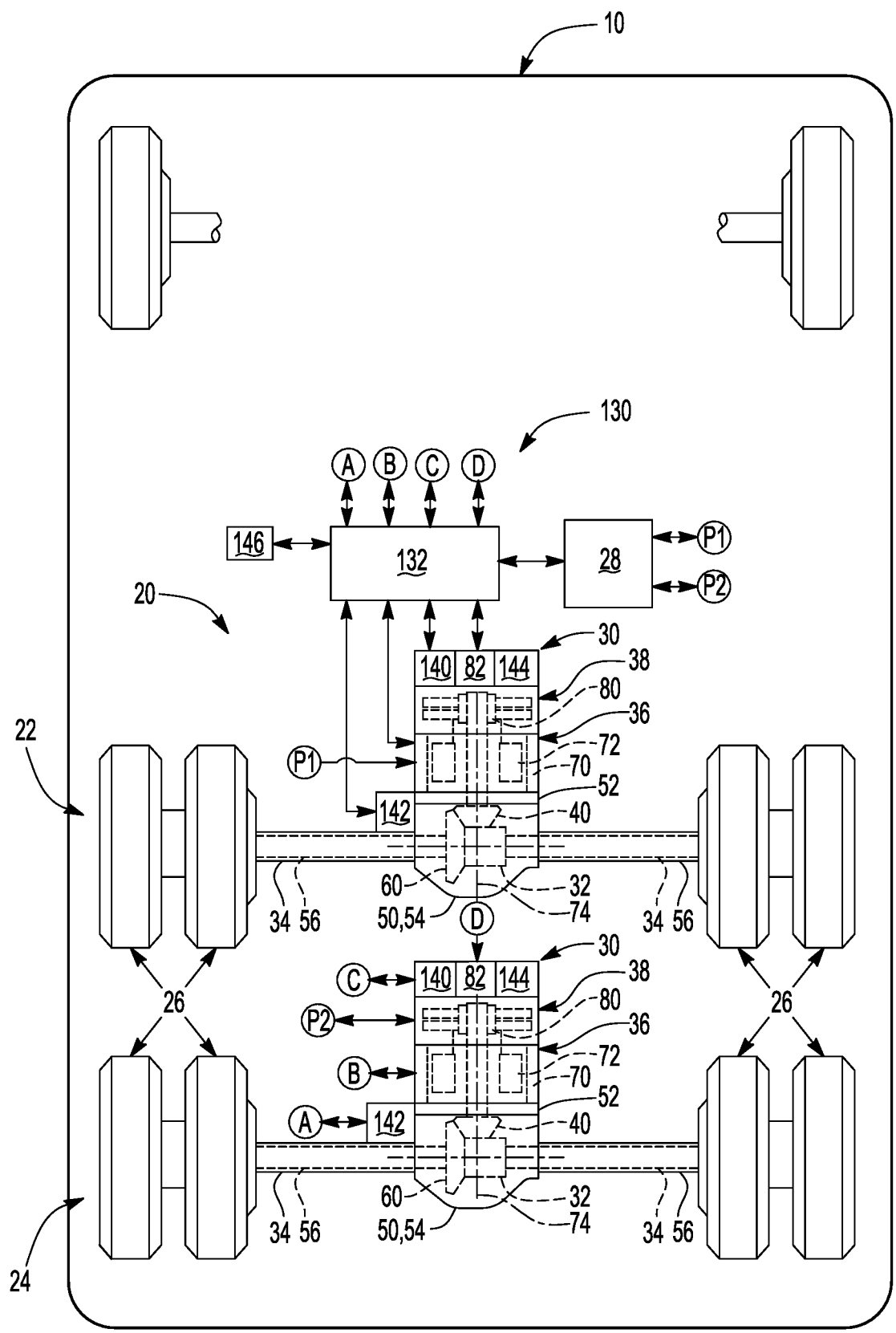
FIG. 1 is a schematic representation of a vehicle having a drive axle system that includes at least one axle assembly.

Referring to FIG. 1, an example of a vehicle 10 is shown. The vehicle 10 may be a motor vehicle like a truck, farm equipment, military transport or weaponry vehicle, or cargo loading equipment for land, air, or marine vessels. The vehicle 10 may include a trailer for transporting cargo in one or more embodiments. The vehicle 10 may include a drive axle system 20.

The drive axle system 20 includes one or more axle assemblies, such as a front axle assembly 22 and a rear axle assembly 24. The front axle assembly 22 and the rear axle assembly 24 are illustrated as drive axle assemblies. A drive axle assembly may be configured to provide torque to one or more wheel assemblies 26 that may be rotatably supported on the axle assembly. A wheel assembly 26 may include a tire disposed on a wheel. The drive axle system 20 may also include or be associated with a power source 28, such as an electrical power source like a battery.

In at least one configuration, the front axle assembly 22 and the rear axle assembly 24 may generally be disposed near each other and may be positioned toward the rear of the vehicle 10, similar to a conventional tandem axle arrangement. However, unlike a conventional tandem axle arrangement, the front axle assembly 22 and the rear axle assembly 24 are not operatively connected to each other and do not receive torque from the same electric motor. As such, the front axle assembly 22 and the rear axle assembly 24 are not connected in series with each other with a shaft, such as a prop shaft that may connect an output of the front axle assembly 22 with an input of the rear axle assembly 24. It is also contemplated that the front axle assembly 22 and the rear axle assembly 24 may be arranged in a different manner, such as with either or both axle assemblies being disposed near the front of the vehicle.

The front axle assembly 22 and the rear axle assembly 24 may have similar or identical configurations. For example, both axle assemblies 22, 24 include a housing assembly 30, a differential assembly 32, a pair of axle shafts 34, an electric motor 36, a transmission 38, a drive pinion 40, or combinations thereof. The positioning of the differential assembly 32, the electric motor 36, and/or the transmission 38 may differ from that shown. For instance, the differential assembly 32 may be positioned between the electric motor 36 and the transmission 38.

The housing assembly 30 receives various components of the axle assembly 22, 24. In addition, the housing assembly 30 may facilitate mounting of the axle assembly to the vehicle 10. In at least one configuration, the housing assembly 30 may include an axle housing 50 and a differential carrier 52.

The axle housing 50 may receive and support the axle shafts 34. In at least one configuration, the axle housing 50 may include a center portion 54 and at least one arm portion 56.

The center portion 54 may be disposed proximate the center of the axle housing 50. The center portion 54 may define a cavity that may receive the differential assembly 32.

One or more arm portions 56 may extend from the center portion 54. For example, two arm portions 56 may extend in opposite directions from the center portion 54 and away from the differential assembly 32. The arm portions 56 may each have a hollow configuration or tubular configuration that may extend around and may receive a corresponding axle shaft 34 and may help separate or isolate the axle shaft 34 from the surrounding environment. A wheel hub may be rotatably disposed on an arm portion 56 and operatively connected to an axle shaft 34. A wheel assembly 26 may be mounted to the wheel hub.

The differential carrier 52 may be mounted to the center portion 54 of the axle housing 50. The differential assembly 32 may be rotatably supported on the differential carrier 52.

The differential assembly 32 is disposed in the housing assembly 30. For instance, the differential assembly 32 may be disposed in the center portion 54 of the axle housing 50. The differential assembly 32 may transmit torque to the axle shafts 34 of the axle assembly and permit the axle shafts and wheel assemblies 26 to rotate at different velocities in a manner known by those skilled in the art. For example, the differential assembly 32 may have a ring gear 60 that may be fixedly mounted on a differential case. The ring gear 60 and the differential case may be rotatable about a differential axis. The differential case may receive differential gears that may be operatively connected to the axle shafts 34.

The axle shafts 34 are configured to transmit torque between the differential assembly 32 and a corresponding wheel hub. For example, two axle shafts 34 may be provided such that each axle shaft 34 extends through a different arm portion 56 of axle housing 50. The axle shafts 34 may be rotatable about an axis, such as a wheel axis or the differential axis.

The electric motor 36 is configured to provide torque, such as propulsion torque or regenerative braking torque. Propulsion torque may be used to propel the vehicle 10, such as in a forward or backward direction. Propulsion torque may also be used to hold the vehicle in a stationary position or to help reduce or limit vehicle rollback, such as on an inclined surface. Regenerative braking may provide a regenerative braking torque, which may also be referred to as regenerative brake torque. Regenerative braking may capture kinetic energy when the electric motor 36 is used to brake or slow the velocity of the vehicle 10. Recovered energy may be transmitted from the wheel assemblies 26 to drive the electric motor 36. Thus, the electric motor 36 may function as a generator and may be used to charge the power source 28. The electric motor 36 may be electrically connected to the power source 28 via an inverter in a manner known by those skilled in the art. Electrical connections between the front axle assembly 22 and the rear axle assembly 24 and the power source 28 are represented with connection symbols P1 and P2, respectively.

The electric motor 36 may be mounted to or positioned inside of the housing assembly 30. The electric motor 36 includes a stator 70 and a rotor 72. The stator 70 may be fixedly positioned with respect to the housing assembly 30. The stator 70 may encircle the rotor 72. The rotor 72 is rotatable about an axis 74 with respect to the stator 70.

The transmission 38 facilitates the transmission of torque between the electric motor 36 and the drive pinion 40. Torque transmission may be bidirectional. The transmission 38 may provide gear reduction and multiple gear ratios between the rotor 72 and the drive pinion 40. The transmission 38 may be of any suitable type. For instance, the transmission 38 may be a countershaft transmission, an epicyclic transmission (e.g., a transmission having a planetary gear set), or the like. A countershaft transmission may include a single countershaft or multiple countershafts. Examples of an axle assembly having a single countershaft transmission are disclosed in U.S. Pat. Nos. 11,002,352 and 11,209,072. Examples of an axle assembly having a dual countershaft transmission is disclosed in U.S. Pat. Nos. 10,989,288, 11,207,976, and 11,220,176. Examples of an axle assembly having an epicyclic transmission are disclosed in U.S. Pat. No. 11,038,396 and U.S. patent application Ser. No. 17/308,307. The disclosures of the references in the preceding three sentences are hereby incorporated in their entirety by reference herein. The transmission 38 may include a clutch 80 and a clutch actuator 82.

A clutch 80 controls rotation of one part with respect to another part. For instance, a clutch may connect and disconnect two parts, such as a driving part and a driven part. A clutch 80 facilitates the engagement and disengagement of a component of the transmission 38 to provide a desired gear ratio. For example, a clutch may selectively couple a gear of a countershaft transmission to a shaft to permit torque transmission via that gear, and hence with an associated gear ratio, and may disengage or be decoupled from that gear to disable torque transmission via that gear. Similarly, a clutch may engage a component of an epicyclic gear set, such as a sun gear, to provide a first gear ratio and may engage another component, such as a planet gear carrier, to provide a second gear ratio. It is contemplated that the same clutch or different clutches may be used to provide different gear ratios. For simplicity, the clutch 80 will primarily be described in the context of a clutch that may move with respect to the drive pinion 40 or slide along the drive pinion 40 between a neutral position and an engaged position.

Figure 2:
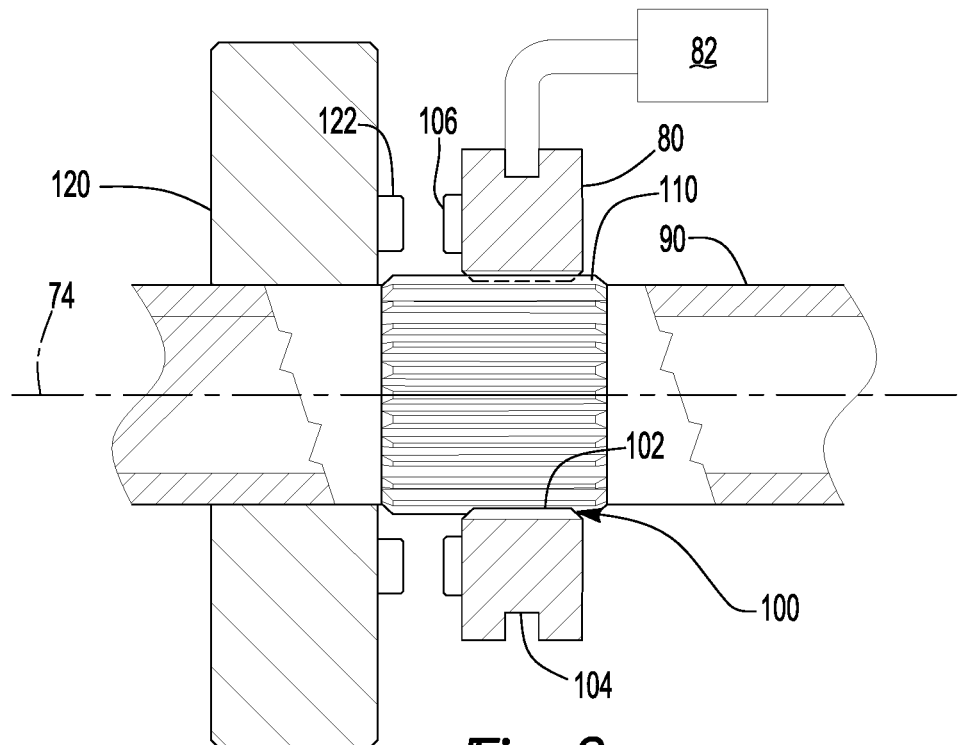
FIG. 2 illustrates an example of a clutch that may be provided with the axle assembly with the clutch in a neutral position.
Figure 3:
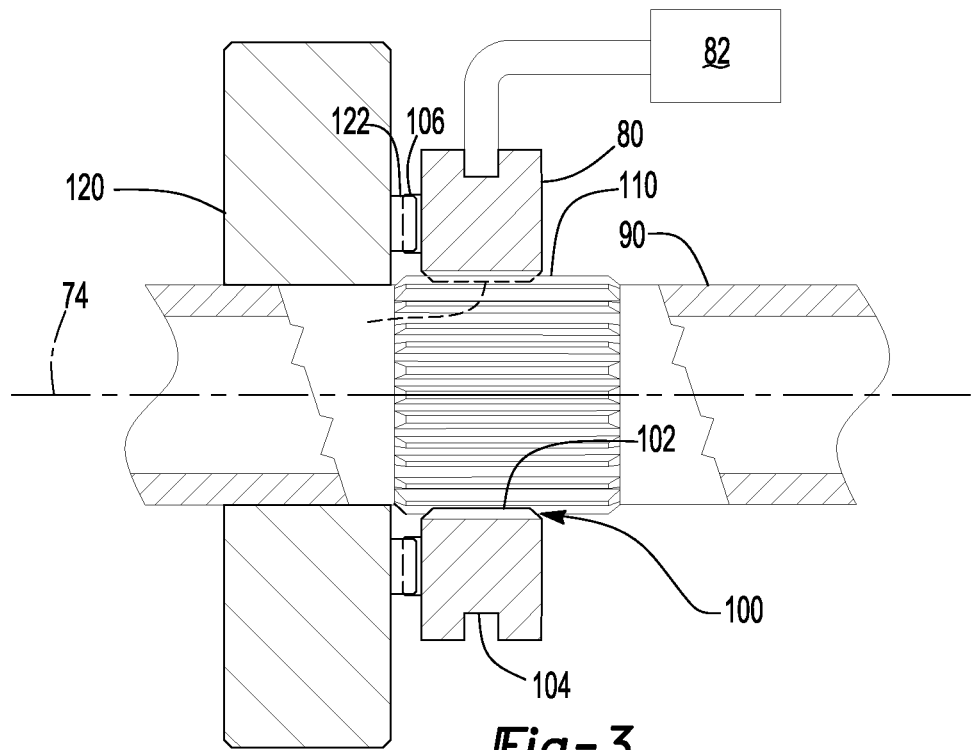
FIG. 3 illustrates the clutch in an engaged position.

A clutch may have any suitable configuration. For example, a clutch 80 may be configured as a friction clutch, like a dog clutch or a spline clutch. An example of a clutch 80 is shown in FIGS. 2 and 3 that is configured as a dog clutch. In such a configuration, the clutch 80 may be configured to slide along a shaft 90, such as a shaft of the drive pinion 40. The clutch 80 may include a clutch hole 100, a clutch spline 102, a clutch groove 104, and a clutch gear 106.

The clutch hole 100 may extend through the clutch 80 and may extend around the shaft 90.

The clutch spline 102 may be disposed in the clutch hole 100. The clutch spline 102 may mate with a spline 110 on the shaft 90. The mating splines may allow the clutch 80 to move in an axial direction along a shaft 90 while inhibiting rotation of the clutch 80 with respect to the shaft Thus, the clutch 80 may be rotatable about an axis (e.g., axis 74) with the shaft 90.

The clutch groove 104, if provided, may face away from the clutch hole 100 and may be configured to receive a linkage, such as a shift fork, that may operatively connect the clutch 80 to the clutch actuator 82.

The clutch gear 106 may have teeth that may be configured to mate with corresponding teeth on a gear 120, such as a gear of the transmission 38. It is also contemplated the that teeth of the clutch gear 106 and clutch engagement teeth 122 of the gear 120 may be configured like a spline and may be received inside a hole in the gear 120 between the shaft 90 and the gear 120 to selectively couple the gear 120 to the shaft 90. The clutch engagement teeth 122 differ from teeth of the gear 120 that may mesh with teeth of another gear of the transmission 38.

The clutch 80 is positionable in a neutral position and an engaged position. An example of a neutral position is shown in FIG. 2. The clutch 80 may be disengaged from gears of the transmission 38, such as gear 120, when in the neutral position. As such, the clutch 80 may be spaced apart from the gear 120 and the gear 120 may be rotatable with respect to the clutch 80 and the shaft 90. An example of an engaged position is shown in FIG. 3. The clutch 80 may engage a gear of the transmission 38, such as gear 120, such that teeth of the clutch gear 106 mesh with clutch engagement teeth 122 of the gear 120.

The clutch actuator 82 may actuate the clutch 80. For instance, the clutch actuator 82 may actuate the clutch 80 between the neutral position and the engaged position. In at least one configuration, the clutch actuator 82 may move the clutch 80 along an axis, such as the axis 74, a countershaft axis, or the like. The clutch actuator 82 may be mounted on or inside the housing assembly 30.

Referring to FIG. 1, the drive pinion 40 operatively connects the differential assembly 32 and the transmission 38. The drive pinion 40 may be received in the housing assembly and may transmit torque between the differential assembly 32 and a transmission 38. The drive pinion 40 may be rotatable about an axis, such as the axis 74, and may have a gear portion that has teeth that meshes with teeth of the ring gear 60 of the differential assembly 32. The shaft 90 may extend from the gear portion. Torque may be transmitted between the transmission 38 and the drive pinion 40 when the drive pinion 40 is operatively connected to the transmission 38. For example, torque that is provided from the electric motor 36 to the transmission 38 and to the drive pinion 40 may be transmitted to the ring gear 60 and thus to the differential assembly 32.

A control system 130 controls operation of the drive axle system 20. For example, the control system 130 may include one or more microprocessor-based control modules or controllers 132 that may be electrically connected to or communicate with components of the vehicle and/or the axle assemblies 22, 24, such as the electric motors 36 and clutch actuators 82. Control system connections are represented by the double arrowed lines in FIG. 1 as well as by connection symbols A, B, C, and D. The control system 130 may also monitor and control the power source 28. In addition, the control system 130 may also process input signals or data from various input devices or sensors. These input devices may include a first speed sensor 140, a second speed sensor 142, a clutch position sensor 144, an operator communication device 146, or combinations thereof.

The first speed sensor 140 may detect or provide a signal indicative of the rotational speed or rotational velocity of a rotatable component disposed upstream from the clutch 80, such as the rotor 72 or a gear of the transmission 38.

The second speed sensor 142 may detect or provide a signal indicative of the rotational speed or rotational velocity of the clutch 80 or a rotatable component disposed downstream from the clutch 80, such as the drive pinion 40, the differential assembly 32, an axle shaft 34, a wheel hub or the like. The first speed sensor 140 and the second speed sensor 142 may be used in conjunction to determine when the rotational speed of the clutch 80 is sufficiently synchronized with the rotational speed of another component, such as a transmission gear like gear 120, to permit movement or shifting of the clutch 80. Accordingly, the terms "synchronized" or "sufficiently synchronized" mean that the rotational speed of two components may be sufficiently close so as to permit the clutch 80 to be shifted and may not require exactly the same rotational speed.

The clutch position sensor 144 is configured to provide a signal indicative of the position of the clutch 80. For instance, the signal may be indicative as to whether the clutch 80 is in the neutral position or the engaged position. The clutch position sensor 144 may directly or indirectly detect or generate a signal indicative of the position of the clutch 80. For instance, the clutch position sensor 144 may be a proximity sensor or the like that may directly detect the position of the clutch 80. Alternatively, the clutch position sensor 144 may indirectly detect the position of the clutch 80, such as by detecting the stroke or actuation distance of the clutch actuator 82 or number of revolutions of a shaft of the clutch actuator 82 when the clutch actuator 82 is configured to rotate to actuate the clutch 80. In such a configuration, the signal may be provided by the clutch actuator 82 or may be based on an operating attribute of the clutch actuator 82.

The operator communication device 146 may be provided to receive an input from an operator or vehicle driver and/or provide information to an operator. The operator communication device 146 may be of any suitable type or types, such as a switch, button, sensor, display, touchscreen, keypad, voice command or speech recognition system, or the like. The operator communication device 146 may be used to input data that may not be predetermined or provided by a sensor or other input device. In addition, the operator communication device 146 may be configured to provide information to the operator, such as a warning or alert that a gear shift has not been completed. Information may be provided to an operator in one or more formats, such as an audible format, visual format, and/or haptic format.

Figure 4:
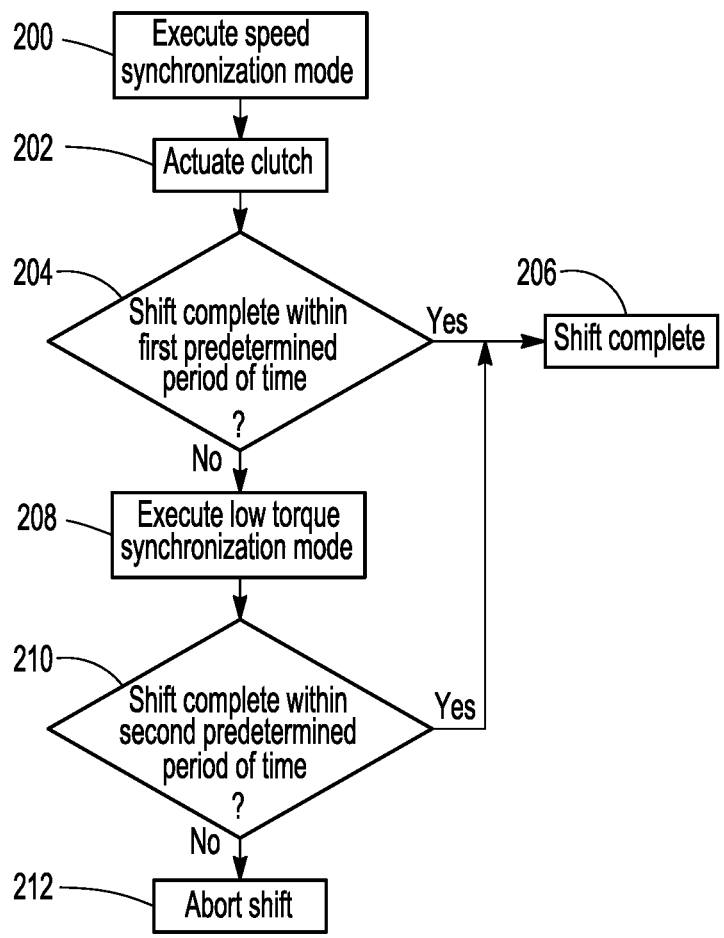
FIG. 4 is a flowchart of a method of controlling the axle assembly.

Referring to FIG. 4, a flowchart of a method of controlling an axle assembly is shown. As will be appreciated by one of ordinary skill in the art, the flowcharts may represent control logic which may be implemented or affected in hardware, software, or a combination of hardware and software. For example, the various functions may be affected by a programmed microprocessor. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multitasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the scope of the present invention. Method steps may be executed by the control system 130 and may be implemented as a closed loop control system.

As an overview, a vehicle that has an axle assembly that has a multi-speed transmission and a corresponding electrical motor can be controlled to facilitate transmission gear shifts, such as an upshift from a first gear ratio (e.g., low speed gear ratio) to a second gear ratio (e.g., a higher speed gear ratio) and downshifts from a second gear ratio to a first gear ratio. The method attempts to conduct a gear shift (upshift or downshift) by executing a speed synchronization mode that modifies the rotational speed of the rotor without clipping (e.g., altering, limiting, or modifying) the torque provided by the electric motor. As a result, electric motor may be able to quickly resume providing the desired or requested level of torque once a gear shift is completed. The clutch may be shifted from one gear ratio to another if sufficient synchronization of the rotational speed of the clutch and the rotational speed of the gear that is to be engaged is obtained.

If sufficient synchronization is not achieved, then the method may execute a low torque synchronization mode that modifies the rotational speed of the rotor while clipping or modifying the output torque of the electric motor. The clutch may be shifted from one gear ratio to another if sufficient synchronization of the rotational speed of the clutch and the rotational speed of the gear that is to be engaged is obtained. If sufficient synchronization is not obtained, then the shift may be aborted.

The method steps shown in FIG. 4 are used to coordinate and execute a gear upshift or a gear downshift. For illustration purposes, the method is described under the following initial operational conditions. First, the rotor of the electric motor is rotating about its axis. Second, the clutch is in the neutral position. In the neutral position, the clutch can rotate about an axis but is not in meshing engagement with a gear of the transmission. The clutch may be spaced apart from the gears of the transmission such that teeth of the clutch may not contact corresponding teeth of the gear of the transmission when the clutch is in the neutral position. In other words, the clutch is spinning but is disengaged from the transmission gears. As a result, the clutch and the transmission gears may be rotating at different speeds. Third, it is desired to shift the clutch from the neutral position into meshing engagement with a gear of the transmission.

Shifting a clutch from the neutral position when the rotor is spinning requires sufficient synchronization between the clutch and the transmission gear to be engaged. Sufficient synchronization include sufficient velocity synchronization and sufficient positional synchronization. Sufficient velocity synchronization is achieved when the clutch and the gear that is to be engaged by the clutch are rotating in the same direction at speeds that are sufficiently close to permit the teeth of the clutch (e.g., teeth of the clutch gear 106) to mesh with corresponding teeth of the gear (e.g., clutch engagement teeth 122). Sufficient positional synchronization is achieved when the teeth of the clutch are sufficiently aligned with gaps between corresponding teeth of the gear to permit the teeth of the clutch to be moved into gaps between corresponding teeth of the gear so that the clutch teeth and corresponding gear teeth may mate and mesh. Sufficient velocity synchronization and sufficient positional synchronization are unlikely to be present without intervention that modifies the rotational speed of the rotor.

At block 200, a speed synchronization mode is executed. The speed synchronization mode is executed by adjusting the rotational speed of the rotor 72 to attempt to match or sufficiently synchronize the rotational speed of the clutch 80 with the rotational speed of the gear that is to be engaged by the clutch 80. In addition, the torque provided by the electric motor 36 may not be clipped. The rotational speed of the rotor 72 may be based on a signal from a speed sensor, such as the first speed sensor 140. The rotational speed of the clutch 80 may be based on a signal from another speed sensor, such as the second speed sensor 142.

At block 202, the clutch 80 is actuated. The clutch 80 may be actuated by operating the clutch actuator 82 to shift the clutch 80 from the neutral position toward the gear that is to be clutched or engaged. For instance, the clutch actuator 82 may shift the clutch 80 toward an engaged position in which the teeth of the clutch 80 (e.g., teeth of the clutch gear 106) would mate or mesh with the teeth (e.g., clutch engagement teeth 122) of the gear that is to be engaged. The clutch 80 may advance or move the engaged position when there is sufficient velocity synchronization and sufficient positional synchronization between the clutch 80 and the transmission gear to be engaged.

At block 204, the method determines whether the shift is completed within a first predetermined period of time. A shift may be completed when there is sufficient velocity and positional synchronization between the clutch 80 and the transmission gear to be engaged and the clutch 80 is moved by the clutch actuator 82 to a position where the teeth of the clutch 80 mate or mesh with the teeth of the gear. Completion of a shift may be based on a signal from the from the clutch position sensor 144. For instance, a shift may be complete when the clutch 80 has moved along its rotational axis by a distance that indicates that there is meshing engagement between the teeth of the clutch gear 106 and corresponding clutch engagement teeth 122. A shift may not be complete when the clutch has moved along its rotational axis by a lesser distance, which may be indicative of a blocked shift in which teeth of the clutch (e.g., teeth of the clutch gear 106) have not been inserted into corresponding gaps between teeth of the transmission gear (e.g., gaps between the clutch engagement teeth 122). A blocked shift may be indicative that sufficient velocity synchronization, sufficient positional synchronization, or both have not been obtained. The first predetermined period of time may be a constant or variable amount that may be based on performance attributes of the axle assembly or vehicle development testing. As a nonlimiting example, the first predetermined period of time may be two seconds or less. If the shift is completed within the first predetermined period of time, then the method may continue at block 206. If the shift is not completed within the first predetermined period of time, then the method may continue at block 208.

At block 206, the clutch 80 has moved to the engaged position in the shift is complete. As a result, the clutch actuator 82 does not need to continue to exert an actuation force on the clutch 80 that urges the clutch 80 toward the engaged position. Thus, operation of the clutch actuator 82 that urges the clutch toward the engaged position is stopped or set to a neutral state in which the clutch actuator 82 does not urge the clutch to move toward or away from the engaged position, thereby helping improve the life of the clutch actuator 82 and reducing energy consumption.

At block 208, a low torque synchronization mode is executed. The low torque synchronization mode may be executed by continuing to exert an actuation force on the clutch 80 with the clutch actuator 82 that urges the clutch 80 toward the engaged position. In other words, the clutch actuator 82 continues to be operated to attempt to complete a gear shift if the speed synchronization mode is not successful. In addition, the low torque synchronization mode is executed by continuing to attempt to match or sufficiently synchronize the rotational speed of the clutch 80 with the rotational speed of the gear that is to be engaged by the clutch 80 by adjusting the rotational speed of the rotor 72. However, unlike the speed synchronization mode, the torque that is provided by the electric motor 36 is clipped. As such, the rotational speed of the rotor 72 may track the rotational speed of the clutch 80 but with limited torque to prevent unintended acceleration or deceleration in the event that sufficient synchronization is achieved to move the clutch 80 to the engaged position. The rotational speed of the rotor 72 may be based on a signal from a speed sensor, such as the first speed sensor 140 as previously discussed. Similarly, the rotational speed of the clutch 80 may be based on a signal from another speed sensor, such as the second speed sensor 142.

At block 210, the method determines whether the shift is completed within a second predetermined period of time. A shift may be completed when sufficient velocity and positional synchronization between the clutch 80 and the transmission gear to be engaged is achieved and the clutch 80 is moved by the clutch actuator 82 to a position where the teeth of the clutch mate or mesh with the teeth of the gear. Completion of a shift may be based on a signal from the clutch position sensor 144 as previously discussed. The second predetermined period of time may be a constant or variable amount that may be based on performance attributes of the axle assembly were vehicle development testing. The second predetermined period of time may be the same as or may differ from the first predetermined period of time. As a nonlimiting example, the second predetermined period of time may be two seconds. It is contemplated that the second predetermined period of time may be greater than the first predetermined period of time there may be a greater likelihood of successfully completing a shift under the low torque synchronization mode. If the shift is completed within the second predetermined period of time, then the method may continue at block 206. If the shift is not completed within the second predetermined period of time, and the method may continue at block 212.

At block 212, the shift may be aborted. Aborting the shift may include operating the clutch actuator 82 to actuate the clutch 80 back to the neutral position. Moving the clutch 80 back to the neutral position may help prevent overheating of the clutch actuator 82 and potential wear of the clutch 80 and/or the gear that was to be engaged. Aborting the shift may also include providing an error signal. The error signal may trigger a notification to the vehicle operator via the operator communication device 146, a diagnostic code to facilitate assessment and maintenance, or both.

The present invention allows an axle assembly to be controlled with a speed synchronization mode to attempt to complete a gear shift without clipping or modifying torque provided by the electric motor, which may improve responsiveness and allow a desired level of torque to be provided more rapidly once a shift is completed. The amount of time attempt to complete a gear shift using the speed synchronization mode may allow the torque provided by the electric motor to better match the torque requested by a vehicle operator, thereby helping improve responsiveness of the axle assembly after a shift is completed. The present invention provides an additional low torque synchronization mode in the event that a shift is not completed using the speed synchronization mode, thereby controlling the electric motor in a different manner that may improve the likelihood of successfully completing a gear shift.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling an axle assembly, the method comprising:
   executing a speed synchronization mode that modifies a rotational speed of a rotor of an electric motor of the axle assembly while maintaining torque provided by the electric motor so that the rotational speed of the rotor becomes closer to a rotational speed of a clutch of the axle assembly, wherein the axle assembly has a transmission that has a set of gears, the electric motor provides torque to the transmission, the rotor is rotatable about an axis and is operatively connected to the transmission, the clutch is selectively engageable with a member of the set of gears, and a clutch actuator is configured to actuate the clutch;
   operating the clutch actuator to shift the clutch from a neutral position toward an engaged position;

determining whether the clutch is shifted from the neutral position to the engaged position within a first predetermined period of time; and executing a low torque synchronization mode when the clutch is not shifted from the neutral position to the engaged position within the first predetermined period of time.

2. The method of claim 1 wherein the clutch is disengaged from the set of gears when in the neutral position.

3. The method of claim 1 wherein the clutch is shifted to the engaged position when teeth of the clutch mesh with teeth of the member of the set of gears.

4. The method of claim 1 wherein the clutch couples the member of the set of gears to a shaft when the clutch is in the engaged position.

5. The method of claim 1 wherein determining whether the clutch is shifted from the neutral position to the engaged position is based on a signal from the clutch actuator.

6. The method of claim 1 wherein determining whether the clutch is shifted from the neutral position to the engaged position is based on a signal from a clutch position sensor that is indicative of a position of the clutch.

7. The method of claim 1 further comprising stopping operation the clutch actuator that shifts the clutch from the neutral position toward the engaged position when shifting of the clutch is completed within the first predetermined period of time.

8. The method of claim 1 wherein the clutch actuator continues to actuate the clutch from the neutral position toward the engaged position when the low torque synchronization mode is executed and the first predetermined period of time has elapsed.

9. The method of claim 1 wherein executing the low torque synchronization mode includes adjusting the rotational speed of the rotor to track the rotational speed of the clutch while limiting output torque of the electric motor.

10. The method of claim 1 wherein limiting output torque of the electric motor prevents unintended acceleration or deceleration when the clutch meshes with the member of the set of gears.

11. The method of claim 1 further comprising determining whether the clutch is shifted from the neutral position to the engaged position within a second predetermined period of time when the low torque synchronization mode is executed.

12. The method of claim 11 wherein the first predetermined period of time differs from the second predetermined period of time.

13. The method of claim 11 wherein the clutch is shifted to the engaged position when teeth of the clutch mesh with teeth of the member of the set of gears.

14. The method of claim 11 wherein determining whether the clutch is shifted from the neutral position to the engaged position is based on a signal from a clutch position sensor that is indicative of a position of the clutch.

15. The method of claim 11 wherein determining whether the clutch is shifted from the neutral position to the engaged position is based on a signal from the clutch actuator.

16. The method of claim 11 further comprising stopping operation the clutch actuator that shifts the clutch from the neutral position toward the engaged position when shifting of the clutch is completed within the second predetermined period of time.

17. The method of claim 11 further comprising operating the clutch actuator to actuate the clutch to the neutral position when shifting of the clutch is not completed within the second predetermined period of time.

18. The method of claim 17 further comprising providing an error signal when shifting of the clutch is not completed within the second predetermined period of time.

19. The method of claim 17 wherein a notification is provided to a vehicle operator via an operator communication device when shifting of the clutch is not completed within the second predetermined period of time.

20. The method of claim 1 wherein limiting output torque of the electric motor prevents unintended deceleration when the clutch meshes with the member of the set of gears.

* * * * *